Aug. 17, 1943.   M. NEBEL   2,326,964
NEEDLE
Filed Aug. 12, 1938   3 Sheets-Sheet 1
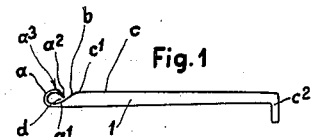
Fig. 1
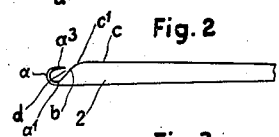
Fig. 2
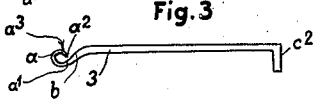
Fig. 3
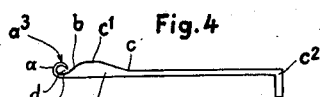
Fig. 4
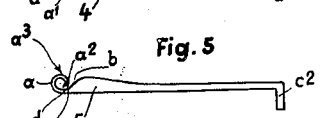
Fig. 5
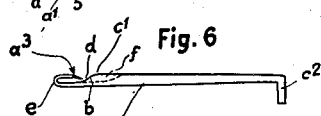
Fig. 6
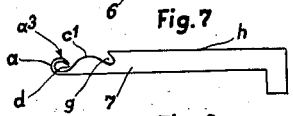
Fig. 7
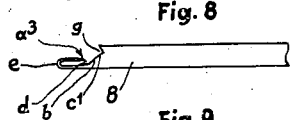
Fig. 8
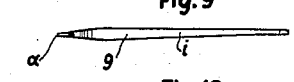
Fig. 9
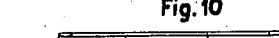
Fig. 10
Fig. 11
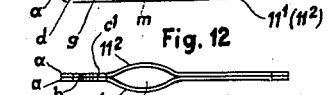
Fig. 12
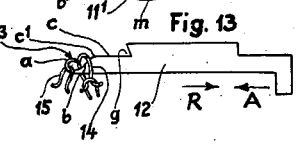
Fig. 13
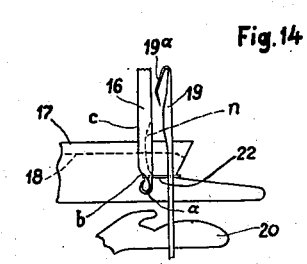
Fig. 14
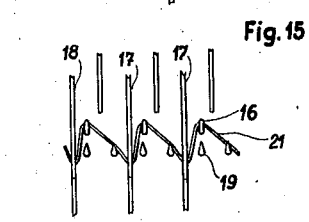
Fig. 15
Fig. 16
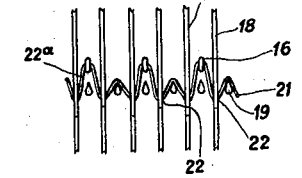
Fig. 17
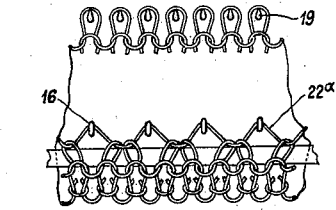
Fig. 18
Inventor;
M. Nebel.

Aug. 17, 1943.    M. NEBEL    2,326,964
NEEDLE
Filed Aug. 12, 1938    3 Sheets-Sheet 2
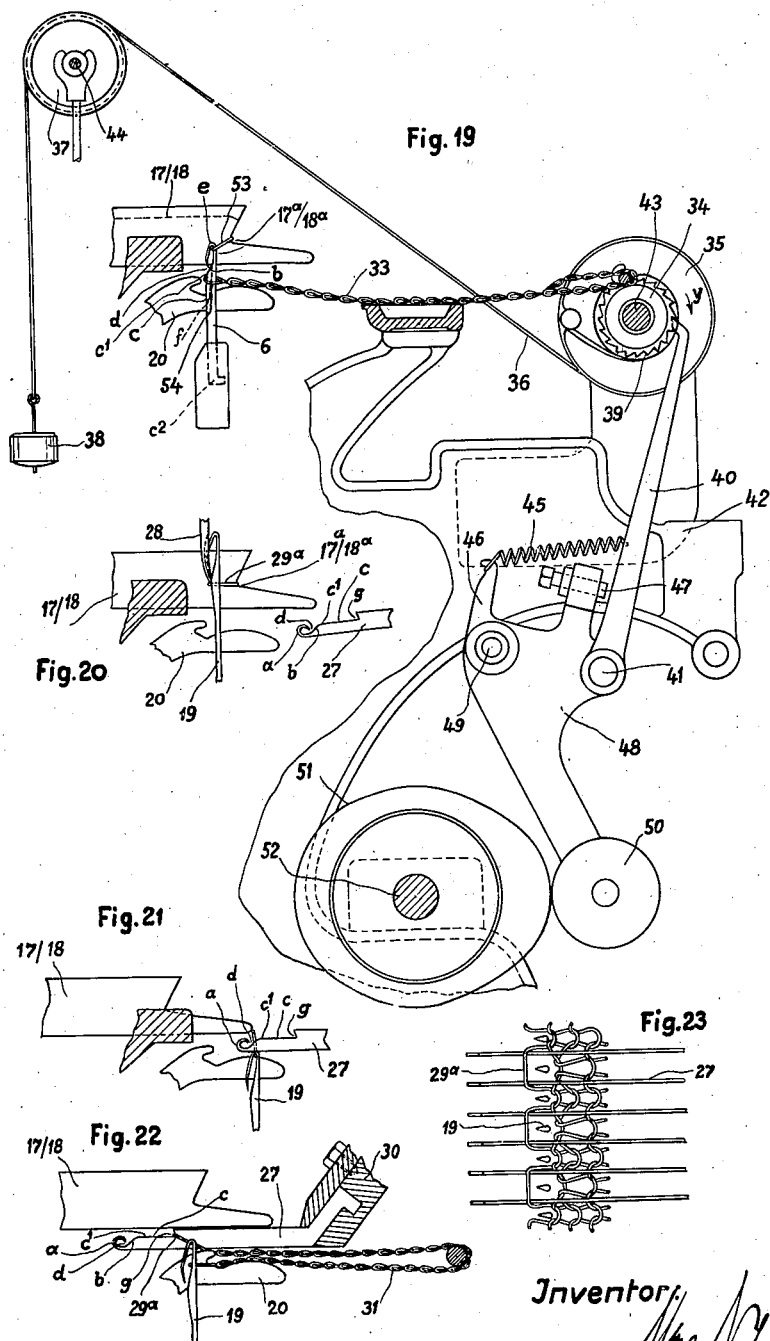

Aug. 17, 1943.    M. NEBEL    2,326,964
NEEDLE
Filed Aug. 12, 1938    3 Sheets-Sheet 3

Inventor:
Max Nebel.

Patented Aug. 17, 1943

2,326,964

UNITED STATES PATENT OFFICE 2,326,964

NEEDLE

Max Nebel, Chemnitz, Germany; vested in the Alien Property Custodian

Application August 12, 1938, Serial No. 224,519
In Germany August 18, 1937

15 Claims. (Cl. 66—96)

This invention relates to a hooked needle for knitting machines adapted for transferring, casting off and forming loops. The hooked needle according to this invention is specially adapted for use in the production of double tops for stockings on flat knitting frames when the first course has to be automatically transferred for the purpose of closing the double top. There are many other uses for this needle, which cover also knitting machines having two needle rows for automatically transferring loops from one row to the needles of the other row as required for instance when passing from 1:1 ribbed goods to plain work.

One of the objects of this invention is to construct the needle in such a manner that the free end of the needle stem has a hook, the base portion of the hook being formed integral with the needle stem. An edge of the stem rises obliquely from the base portion of the hook in the plane of the hook and away from the hook to form an inclined edge, the highest point of which is located above the hook opening when the needle is in a horizontal position with its hook extending upwardly. The free end of the hook is spaced from the inclined edge a distance sufficient to permit passage of a thread to and from the hook during loop forming, but is spaced sufficiently close to the inclined edge that during the loop casting operation a loop will pass from the stem over the space between the stem and the free end of the hook without entering the hook.

Another object of the invention is the special configuration of the hook and its arrangement relative to the needle shank.

Another object of the invention is to provide for an inelastic hook.

Another object of the invention is to provide an elastic hook.

Another object of the invention is to provide a hook the free end of which is bent in toward the base of the hook.

Another object of the invention is to provide a hook having an opening which is formed by the distance of the point of the free end of the hook from an edge obliquely ascending from the base of the hook and which is only of such size that threads can easily enter and emerge from the hook easily and with slight play.

Another object of the invention is to impart a special shape to the part of the needle positioned in the rear of the hook.

Another object of the invention is to cause the ascending edge of the needle to extend in axial direction or approximately so beyond the highest point of the inclined edge.

Another object of the invention is to cause the needle to slope down again to the rear of the highest point of the ascending edge in the plane of the hook.

Another object of the invention is to provide a notch to the rear of the highest point of the obliquely ascending edge and, above the highest point of the edge ascending in the plane of the hook, to extend the edge in axial or almost axial direction.

Another object of the invention is to provide an eye on the needle stem to the rear of the highest point of the edge obliquely ascending in the plane of the hook.

Another object of the invention is to impart to the needle a round or oval shape.

Another object of the invention is to impart to the needle a flat and sinkerlike shape.

Another object of the invention is to arrange two needles side by side and to bend them outwardly in opposite directions to the rear of the highest point of the edge obliquely ascending in the plane of the hook so as to provide in the rear of this point an opening in the direction of the plane of the hook for permitting other tools to enter between the needles rectangularly to axial direction.

Still another object of the invention is to provide a needle adapted to special working methods as required for transferring loops, closing a double top worked on flat knitting frames and transferring and forming loops on knitting machines provided with two rows or circles of needles.

The invention is illustrated by way of example in the accompanying drawings, in which Fig. 1 is a side view of the needle-like tool constructed according to the present invention;

Fig. 2 through 8 are side views of further modifications of the needle-like tool;

Figs. 9 and 10 are plan views of other modifications;

Fig. 11 is a side view and Fig. 12 is a plan view of Fig. 11 showing a still further modification;

Fig. 13 is a side view of another modification of the needle-like tool;

Fig. 14 is a side view of the knitting tools in position for taking up the first course of a double top;

Fig. 15 is a top view of the knitting tools of Fig. 14 during sinking operation;

Fig. 16 shows a top view of the knitting tools after dividing;

Fig. 17 is a top view of the transfer of the meshes to the needle, showing several courses worked after the first course of the double top;

Fig. 18 is a side view of the transfer operation;

Fig. 19 shows a form of the needle for transferring a double top, the needle acting also as frame needle;

Figs. 20 to 23 show a different arrangement of the needles for transferring a double top;

Figure 24:
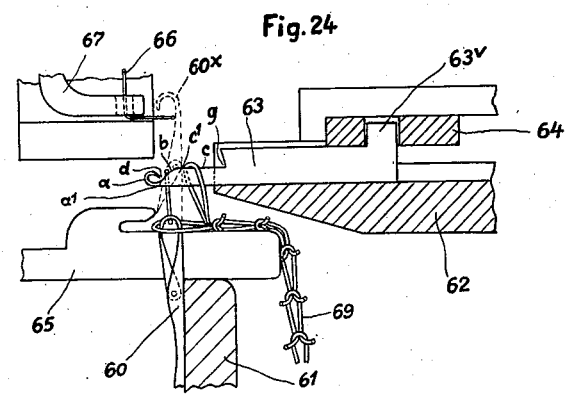
Figs. 24 to 26 show the needle arranged in a knitting machine having two needle rows.

The hooked needle 1 shown in Fig. 1 has a hook $a$. From the base $a^1$ of the hook $a$ the needle edge $b$ obliquely ascends in the plane of the hook $a$ in the direction away from the hook up to the highest point $c^1$ of the needle edge $c$. This highest point $c^1$ is positioned above the hook opening $d$ when the needle is in a horizontal position with its hook extending upwardly. The free end $a^2$ of the hook $a$ is bent in towards the base $a^1$ so that the apex $a^3$ is located above the needle axis. Usually, the apex is positioned not higher than the highest point $c^1$ of the obliquely ascending edge $b$ of the needle stem or shank. The mode of operation of the needle 1 is not affected by the position of the apex $a^3$ relative to the point $c^1$, and the apex $a^3$ may therefore be positioned also above the highest point $c^1$, because, as the free end $a^2$ proceeding from the apex $a^3$ is bent in toward the base $a^1$, the important feature is retained that the highest point of the oblique edge of the stem is positioned above the hook opening when the needle is in a horizontal position with its hook extending upwardly.

The free end $a^2$ of the needle 2 shown in Fig. 2 is not bent in but extends approximately parallel up to the edge $c$ on the same side. The highest point $c^1$ of the obliquely ascending edge $b$ is, however, located on a higher level than the opening $d$ of the hook $a$ when the needle is in a horizontal position with its hook extending upwardly.

The stem of the needles shown in Figs. 1 and 2 has a flat shape. In the needle shown in Fig. 3 the ascending edge $b$ is produced by bending the needle shank. The needle shown in Fig. 4 indicates how the edge $c$ on the side of the ascending edge $b$ slopes down again from the highest point $c^1$ at the end of the oblique edge $b$ toward the end $c^2$ of the needle.

The needle shown in Fig. 5 is similarly constructed as the needle 4 with the difference, however, that the free end $a^2$ of the hook is bent in to a greater extent. The highest point $a^3$ of the hook $a$ is on a higher level than the highest point of the oblique edge $b$.

The needle 6 in Fig. 6 has a long hook $e$ which resembles in shape the known hooks of the needle bars in Cotton machines. The highest point $c^1$ of the edge $b$ rising obliquely from the base of the hook in the plane thereof is positioned above the hook opening when the needle is in a horizontal position with its hook extending upwardly. The needle 6 is furthermore provided with an eye $f$ at the highest point $c^1$.

Fig. 7 shows a needle 7, in which a groove or notch $g$ is cut to the rear of the highest point $c^1$. The edge $h$ located in the plane of the hook on the side of the opening $d$ in the rear of the groove $g$ is positioned still higher than the highest point $c^1$ so as to enable the upper edge of the groove $g$ firmly to catch and to hold the thread or loop sliding over the point $c^1$. The throat $g$ lies on a lower level than the highest point $c^1$ between the throat $g$ and the hook opening $d$ when the needle is in a horizontal position with its hook extending upwardly.

The needle 8 shown in Fig. 8 also has a throat $g$ which directly connects, however, with the highest point $c^1$ above the opening $d$ when the needle is in a horizontal position with its hook extending upwardly. The hook has a form similar to that of the hook $e$ of the needle 6 shown in Fig. 6 and is also designated $e$.

Fig. 9 shows a needle 9 whose shank $i$ increases in thickness from the base of the hook transversely to the plane thereof. This increase in thickness serves the purpose of laterally covering the free end of the hook.

Fig. 10 shows a needle 10 the stem $k$ of which extends from the hook $a$ in the plane thereof without increasing in thickness. To render the thickness of the needle transversely to the plane of the hook better visible the needles 9 and 10 in Figs. 9 and 10 are so drawn as to be seen in the direction of the hook. The plane of the hook is therefore disposed perpendicularly to the plane of the drawing while in Figs. 1 to 8 the plane of the hook coincides with that of the drawing.

Figs. 11 and 12 show a two-part needle comprising two needles $11^1$, $11^2$ which are elastically placed together in such manner that both hooks $a$ are adjacent to the hook opening $d$ of the ascending edge $b$, the highest point $c^1$ and a rearwardly arranged throat $g$. At the throat $g$ the stem of the needle separates to provide a gap or eye $m$ between both needles $11^1$ and $11^2$.

Fig. 13 shows a needle 12 having a throat $g$ in the rear of the highest point $c^1$ of the edge $b$ obliquely ascending from the root or base of the hook $a$.

The various modifications of the needles shown in Figs. 1 through 13 may have either elastic or inelastic hooks.

Fig. 13 also shows how a mesh 14 which hung on the edge $c$, through the return motion of the needle in the direction R from the highest point $c'$, slides over the hook opening and over the hook itself and is therefore thrown off over the loop or mesh 15 hanging in the hook without necessitating the mechanical closing of the hook opening. The edge $b$ obliquely ascends relative to the edge $c$ of the needle shank to permit the loop to slide out of the hook and upon the edge $c$ of the shank during motion of the needle in the direction A.

The various types of needles described are adapted to many uses some of which will be explained below.

Figs. 14 to 18 show how needles according to the invention may be employed for transferring a double top in flat knitting frames. The needles 16 used for this purpose are generally constructed like the needle 1 except that eyes are provided opposite the edges $c$. The figures further show a side and top view of jack sinkers 17, dividing sinkers 18, frame needles 19 and a knocking over bit 20. By the sinkers 17 a course of loops is sunk against the edge $c$ of the needles 16.

Fig. 14 shows the position of the tools after dividing against the edges $b$. The sunk and divided loops 22 then slide through the openings $d$ into the hooks a owing to the tension due to dividing.

Fig. 15 shows a plan view of the tools after sinking and prior to dividing. The thread 21 has been sunk by the jack sinkers 17 against the edges c of the needles 16. The frame needles 19 have not yet become active.

Fig. 16 shows the position of the thread after dividing. The dividing sinkers 18 have advanced and divided the thread 21 to form the loops 22. In front of every other frame needle 19 a needle 16 is disposed so that after dividing, the loops 22 are alternately hanging on the frame needles 19 and the needles 16. After the initial course has been worked with the loops 22 and 22a the needles 16 are moved to the rear of the frame needles 19 during the period when the needles 19 occupy the lowest position in knocking over. The loops 22a remain on the needles 16 while the fabric for the double top is being worked and are visible also in Fig. 17 which shows several courses worked after the first course of the double top.

Fig. 18 shows the finished courses of the double top 24. In order to close the double top the loops 22a of the first course still hanging on the needles 16 have to be transferred together with the last-worked loops 22b of the top 24 to the frame needles 19. As indicated in Fig. 18, this is done by moving the needles 16 again in front of the frame needles 19 so that the hooks a of the needles 16 are located below the head of the frame needles 19 and the hooks 19a of the frame needles 19 are inserted in the eye n of the needles 16 and the needles 19 enter the loops 22a.

The heads of the frame needles 19 and the hooks a of the needles 16 are on so low a level that the hooks are positioned under the lower edge of the sinkers 17 and 18. The needles 19 will then move up and engage the loop 22a, whereupon the needles 16 move up, the tension of the fabric 24 being so regulated that the loops 22a lie without pull in the plane of the hook a against the opening d and can thus slide without impediment over the hook a to be passed to the needles 19. This is followed by the regular loop forming operation and the closing of the double top in the manner usual in flat knitting frames.

Figs. 20 to 23 show another method of mechanically closing a double top, in which besides the needles 27 constructed according to the invention transfer needles 28 are employed. The needles 27 are similar to the needle 12 shown in Fig. 13 and like the latter are provided with throats g in the rear of the highest points $c^1$ of the obliquely ascending edges b. Seen transversely to the plane of the hooks, the needles 27 are quite narrow and have about the same width as the needle 10 shown in Fig. 10, i. e., they are as flat as a sinker.

Figs. 20 to 23 further show the sinkers 17 and 18, the knocking over bits 20 and the frame needles 19. The initial course is sunk in known manner, every other loop being thrown off over the needle heads owing to the provision of the transfer needles 28 in front of every other needle, which throw off every second loop 29a prior to the pressing operation. Between every two frame needles 19 one needle 27, capable of to and fro and up and down motion with respect to the needles 19, is provided. The needles 27 are arranged in a bar 30 which is movably positioned in front of the row of frame needles and the sinkers. The bar 30 is movable to such an extent that the needles 27 carried by it can enter between the frame needles 19 against the sinking motion of the sinkers. The thrown off loops 29a, owing to the pull exerted by the motion of the needles, are brought out of the landing position shown in Fig. 20 into the knocking over position shown in Fig. 21 and into the hooks a of the needles 27 which enter the needle row below the sinkers and pass through the loops 29a. By the further downward motion of the frame needles 19 and the simultaneous movement of the needles 27 out of the row of needles 19 the loops 29a are brought through the openings d into the hooks a, as indicated in Fig. 21 if it is assumed that the needles 19 are moving down. The needles 27 then slightly move out of the row of frame needles and while the fabric for the double top is being worked hold the loops 29a of the first course in their hooks. These needles act therefore in the manner of a take up bar which had to be hung in the first course for manual double top work. When the fabric 31 for the double top has been completed, the top is closed, as shown in Figs. 22 and 23. For this purpose the needles 27 move below the lower edge of the sinkers 18 and 17 toward the needle row so that the loops 29a held by the throats g are spread apart above the needles 19, as shown particularly in Fig. 23. Each loop 29a is carried by two needles 27 and spread above the frame needles 19. Owing to the pull due to take up the loops 29a have slipped out of the hooks a, over the oblique edges b, on the upper edges c and into the throats g. During transfer of the loops 29a to the frame needles 19 for the purpose of closing the double top the bar 30 places the needles 27 so far between the sinkers 17, 18 and the knocking over bits 20 that the loops 29a hanging in the throats g and spread by the needles 27 above the frame needles 19 (Fig. 23) are taken up by the frame needles 19 during upward motion of the latter. After the loops 29a have been taken up by the frame needles 19 the needles 27 come out of the needle row and remain inoperative, as indicated in Fig. 20, until a fresh initial course for a new stocking is started. That the loops or threads 29a can slip over the hooks of the needles 27 is due to the fact that the loops do not pass into the hooks, since during withdrawal the tension of the fabric 31 the pull of which operates in the direction of the stem of the needles 27 does not draw the loops 29a toward the opening of the hooks. This arrangement can be improved still more by somewhat easing the pull of the fabric by the take up device.

Fig. 19 shows the use of the needles according to the invention as frame needles set in a bar of a knitting frame, for instance a Cotton machine. The needles 6 are of the type shown in Fig. 6, and Fig. 19 indicates the mode of operation of such needles in a flat knitting frame. Besides the needles 6 replacing the ordinary frame needles there are the jack sinkers 17, the dividing sinkers 18 and the fabric 33 which is wound upon the take up roller 34 kept tensioned by a rope pull and a sheave 35 holding the cord 36 which is drawn over a roll 37 in the direction y by a weight 38. The pull is locked by means of a ratchet gear 39 engaged by a pawl 40 articulated to a pin 41 which is secured to an arm of a three-armed lever 48. The winding roll 34 is rotatably disposed on a shaft 43 secured to the machine frame 42. The sheave 37 is rotatably disposed on a pin 44 secured to the machine frame 42. The pawl 40 on the pin 41 is drawn against ratchet gear 39 by a spring 45 arranged on a hook 46. The angular position of the pawl 40 relative to the hook 46 is maintained by means of a set screw 47. The hook 46 is secured to the second arm of the lever 48 which is arranged on a pin 49 secured to the frame 42. The third arm of the lever 48 opposite the hook 46 supports a roll 50 upon which acts an eccentric 51 provided on an eccentric shaft 52.

This locking mechanism actuated by the eccentric 51 serves for starting and stopping the action of the pull of the rope 36 on the winding means and also, by means of a second eccentric on which the roll 50 may be placed, for reducing the pull exerted upon the fabric 33 when the loops 54 are to slip over the hook openings $d$. This is necessary at the formation of each course if the needles 6 according to the invention are to be used as frame needles for looping.

Sinking of the thread to form loops 53, if the needles 6 are to serve as frame needles, is carried out against the oblique edges $b$ of the needles 6 or, what is more advantageous, against the edges $c$ of the stem, which connect with the highest points $c^1$ of the edges $b$. The regular pressing operation for throwing the last loop 54 over the loops newly formed of the thread does not occur, but the needles go down in the direction of their stems without lateral motion while the loops sunk from the thread and divided are hanging under tension between the sinker throats 18a and 17a and the needle shanks or the bases of the hooks, so that these loops 53 sunk and divided from the thread slide along the inclined edges $b$ through the openings $d$ into the hooks $e$. During farther descent of the needles 6 the old loops 54 hanging on the needle shanks slide, however, over the hooks $b$ and are thrown off over the loops 53 for the purpose of looping. Tensionless hanging during the throwing off operation is attained by causing the pawl 40, owing to special configuration of the eccentric 51, to act on the winding means in such manner that the tension of the fabric, normally averted from the needles 6, has been somewhat reduced with the result that at the throwing off moment the old loops 54 hang on the needles 6 without tension.

The examples of working with the needles according to the invention as described with reference to a double top show how the needles have to be handled for taking up threads or loops or for throwing off threads or loops over the hooks.

When therefore the threads or loops are to be thrown off from the hooks of the needles, it is necessary that the threads or loops whose direction of pull extends in the plane of the hooks toward the openings thereof must hang without the least tensile stress on the needle shanks at the moment they slide over the hook openings. Usually, the threads or loops are under tension when in this condition. The tensile stress can be reduced by eliminating the pull of the take up means or rendered ineffective by a corresponding shifting of the direction of pull.

However, when the threads or loops are to enter into the hooks, the threads or loops at the entering moment must lie under tension on the inclined edge $b$ connecting with the bases of the hooks, and the direction of the tension or of a component thereof should be in the plane of the hooks toward the hook openings. This pull of the threads or loops in the plane of the needles in the direction of the hook openings is produced by the tensioning of the thread during sinking and dividing, provided loops to be sunk or already sunk and divided loops or threads not formed into loops by the jack sinkers or the sinker needles are to be put into the hooks. However, if finished loops are to be brought into the hooks, the necessary tension is caused by the ordinary take up means.

The various uses of the needle according to the invention have been explained above by examples. How these needles may be employed also in knitting machines having two rows of needles will be described below.

Figure 25:
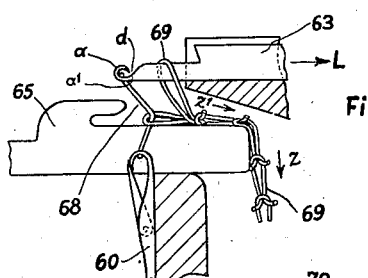
Figure 26:
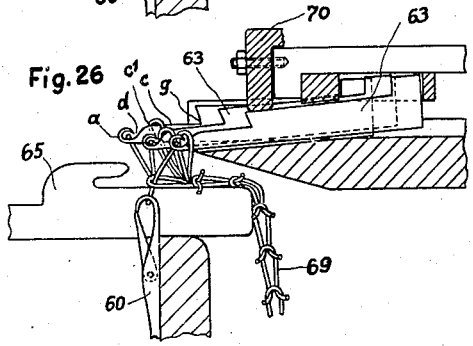

As previously stated, the needles may serve as auxiliary tools for transferring and forming loops in knitting machines having two rows of needles which are usually of the latch type. In Figs. 24 to 26 side views of the two needle rows of such machines are indicated. One of these rows with its vertical needles 60 is provided in the bed plate 61 and the other row in the bed plate 62. The needles 60 are regular latch needles, but in the other bed 62 the regular latch needles are replaced by needles 63 constructed according to the invention and resembling the needle 12 shown in Fig. 13 except that the heels 63v are different owing to the type and arrangement of the cam 64 which moves these needles to and fro. In addition to the two needle rows and the beds 61 and 62 a row comprising the sinkers 65 is provided which serve for knocking over the loops. The threads 66 are held by thread guides 67. When by the needles 60 the threads are sunk over the needles 63 to form loops 68 and the latter are to be placed in the hooks of the needles 63, the pull produced by the needles 60, during sinking will suffice to bring the loops 68 into the hooks $a$ of the needles 63, as indicated in Fig. 25. The beginning of the sinking operation is made visible in Fig. 24 by the dotted line of the needles 60x which catch the threads and form it into loops 68 across the needles 63 by their descent to the position shown in Fig. 25. If old meshes 69 hanging on the needles 63 are to be thrown off over the loops 68, the tension of the fabric 69 is reduced and the loops 69 slide during the return motion of the needle-like sinkers 63 in the direction L over the hook openings $d$ and the hooks $a$. The loops 69 are therefore thrown off over the loops 68. If for structural or other reasons the tensioning of the loops 69 is not to be relieved by reducing the take-up, the direction of pull $Z^1$, as indicated in Figs. 24 and 25, of the take-up is arranged so that it is approximately parallel to the needle-like sinkers 63 and the loops 69 will bear against the openings $d$ without any tension during the casting-off operation. If the stress is not removed from the loops 69 by means of the take-up, the invention provides, as shown in Fig. 26, for depressing the needle-like sinkers 63 where the loops 69 are to be cast off by means of a lever 70.

Figure 27:
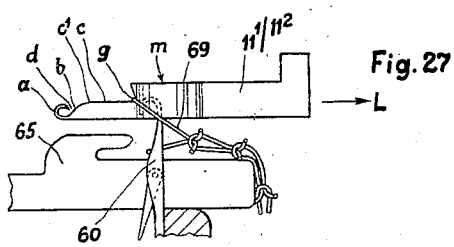
Figs. 27 and 28 show the special use of a needle shown in Figs. 11, 12 and 13.
Figure 28:
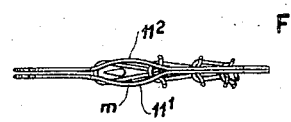

Figs. 27 and 28 show how in machines of the type to which Figs. 24 to 26 refer the loops 69 hanging on the upper needle row can be transferred to the open needles 60 of the other row. For this purpose double needles $11^1$, $11^2$ are provided of the kind shown in Figs. 11 and 12 and described above.

The double needles $11^1$, $11^2$ are so far advanced for the purpose of transferring their loops 69 that their throats $g$ catch the loops 69 and place them over the needles 60 of the other row, and the outward bulges $m$ spread out the loops 69. During their ascent the needles 60 enter the eyes formed by the bulges $m$ of the double needles $11^1$, $11^2$ and penetrate the spread loops 69. The double needles $11^1$, $11^2$ then move back in the direction L, the needles 60 slide between the two springy needles $11^1$, $11^2$ and the loops 69 are cast off over the hooks a and hang on the needles 60 which can work these loops at will.

Still other uses of the needle could be mentioned, but the essential feature of the invention is the specific shape of the needle, which may be varied of course according to whether a thread, a half-finished or finished loop is to enter the hook or is to be cast off over the hook or whether a thread or loop is to be laid on the edge c or inclined edge b with or without tension in the direction of the plane of the hook and towards the opening of the hook at the moment when the thread or loop is entering or sliding over the hook.

I claim:

1. A latchless hooked needle for knitting machines adapted for transferring, casting-off, and forming loops comprising a stem, a hook having a base portion formed integrally with one end of the stem, said stem having an edge rising obliquely from the base portion of said hook in the plane thereof and away from the hook to form an inclined edge the highest point of which is located above said hook opening when the needle is in a horizontal position with its hook extending upwardly, the hook opening being defined by the distance of the free end of said hook from said inclined edge, said free end of the hook being spaced from said inclined edge a distance sufficient to permit passage of a thread to and from the hook during loop forming, but spaced sufficiently close to the inclined edge that during loop casting a loop will pass from the stem of the needle over the space between the stem and free end of the hook without entering the hook.

2. A latchless hooked needle for knitting machines adapted for transferring, casting-off, and forming loops comprising a stem, a hook having a base portion formed integrally with one end of the stem, said stem having an edge rising obliquely from the base portion of said hook in the plane thereof and away from the hook to form an inclined edge the highest point of which is located above said hook opening and is not above the highest point of said hook when the needle is in a horizontal position with its hook extending upwardly, the hook opening being defined by the distance of the free end of said hook from said inclined edge, said free end of said hook being spaced from said inclined edge a distance sufficient to permit passage of a thread to and from the hook during loop forming, but spaced sufficiently close to the inclined edge that during loop casting a loop will pass from the stem of the needle over the space between the stem and free end of the hook without entering the hook.

3. A latchless hooked needle for knitting machines adapted for transferring, casting-off, and forming loops comprising a stem, a hook having a base portion formed integrally with one end of the stem, the free end of said hook being bent towards the base portion, said stem having an edge rising obliquely from the base portion of said hook in the plane thereof and away from the hook to form an inclined edge the highest point of which is located above said hook opening and is not above the highest point of said hook when the needle is in a horizontal position with its hook extending upwardly, the hook opening being defined by the distance of the free end of said hook from said inclined edge, said free end of said hook being spaced from said inclined edge a distance sufficient to permit passage of a thread to and from the hook during loop forming, but spaced sufficiently close to the inclined edge that during loop casting a loop will pass from the stem of the needle over the space between the stem and free end of the hook without entering the hook.

4. A latchless hooked needle for knitting machines adapted for transferring, casting-off, and forming loops comprising a stem, a hook having a base portion formed integrally with one end of the stem, said stem having an edge rising obliquely from the base portion of said hook in the plane thereof and away from the hook to form an inclined edge the highest point of which is located above said hook opening and is not above the highest point of said hook when the needle is in a horizontal position with its hook extending upwardly, said edge extending from its highest point in the axial direction of the stem, the hook opening being defined by the distance of the free end of said hook from said inclined edge, said free end of said hook being spaced from said inclined edge a distance sufficient to permit passage of a thread to and from the hook during loop forming, but spaced sufficiently close to the inclined edge that during loop casting a loop will pass from the stem of the needle over the space between the stem and free end of the hook without entering the hook.

5. A latchless hooked needle for knitting machines adapted for transferring, casting-off, and forming loops comprising a stem, a hook having a base portion formed integrally with one end of the stem, said stem having an edge rising obliquely from the base portion of said hook in the plane thereof and away from the hook to form an inclined edge the highest point of which is located above said hook opening and is not above the highest point of said hook when the needle is in a horizontal position with its hook extending upwardly, said edge extending from the highest point in the axial direction of the stem, and an eye in the stem opposite the highest point of said inclined edge, said eye forming a free passage into the needle stem the hook opening being defined by the distance of the free end of said hook from said inclined edge, said free end of said hook being spaced from said inclined edge a distance sufficient to permit passage of a thread to and from the hook during loop forming, but spaced sufficiently close to the inclined edge that during loop casting a loop will pass from the stem of the needle over the space between the stem and free end of the hook without entering the hook.

6. A latchless hooked needle for knitting machines adapted for transferring, casting-off, and forming loops comprising a stem, a hook having a base portion formed integrally with one end of the stem, said stem having an edge rising obliquely from the base portion of said hook in the plane thereof and away from the hook to form an inclined edge the highest point of which is located above said hook opening and is above the highest point of said hook when the needle is in a horizontal position with its hook extending upwardly, the hook opening being defined by the distance of the free end of said hook from said inclined edge, said free end of said hook being spaced from said inclined edge a distance sufficient to permit passage of a thread to and from the hook during the loop forming, but spaced sufficiently close to the inclined edge that during loop casting a loop will pass from the stem of the needle over the space between the stem and free end of the hook without entering the hook.

7. A latchless hooked needle for knitting machines adapted for transferring, casting-off, and forming loops comprising a stem, a hook having a base portion formed integrally with one end of the stem, said stem having an edge rising obliquely from the base portion of said hook in the plane thereof and away from the hook to form an inclined edge the highest point of which is located above said hook opening and is above the highest point of said hook when the needle is in a horizontal position with its hook extending upwardly, said edge slanting from its highest point in a direction averted from said hook, the hook opening being defined by the distance of the free end of said hook from said inclined edge, said free end of said hook being spaced from said inclined edge a distance sufficient to permit passage of a thread to and from the hook during loop forming, but spaced sufficiently close to the inclined edge that during loop casting a loop will pass from the stem of the needle over the space between the stem and free end of the hook without entering the hook.

8. A latchless hooked needle for knitting machines adapted for transferring, casting-off, and forming loops comprising a stem, a hook having a base portion formed integrally with one end of the stem, said stem having an edge rising obliquely from the base portion of said hook in the plane thereof and away from the hook to form an inclined edge the highest point of which is located above said hook opening and is above the highest point of said hook when the needle is in a horizontal position with its hook extending upwardly, an eye in the stem at the highest point of said inclined edge, the hook opening being defined by the distance of the free end of said hook from said inclined edge, said free end of said hook being spaced from said inclined edge a distance sufficient to permit passage of a thread to and from the hook during loop forming, but spaced sufficiently close to the inclined edge that during loop casting a loop will pass from the stem of the needle over the space between the stem and free end of the hook without entering the hook.

9. A latchless hooked needle for knitting machines adapted for transferring, casting-off, and forming loops comprising a stem, a hook having a base portion formed integrally with one end of the stem, said stem having an edge rising obliquely from the base portion of said hook in the plane thereof and away from the hook to form an inclined edge the highest point of which is located above said hook opening when the needle is in a horizontal position with its hook extending upwardly, the hook opening being defined by the distance of the free end of said hook from said inclined edge, said free end of the hook being spaced from said inclined edge a distance sufficient to permit passage of a thread to and from the hook during loop forming, but spaced sufficiently close to the inclined edge that during loop casting a loop will pass from the stem of the needle over the space between the stem and free end of the hook without entering the hook, the stem of said needle-like tool being elastic at right angles to the plane of the hook in the rear of the highest point of said edge, bent away from the plane of the hook and then bent back again into said plane, and a second needle whose stem is bent in a direction opposite to the bend of the first needle, and means for securing the two needles together at the end opposite the hook.

10. In a knitting machine, a plurality of latchless needles adapted for transferring, casting-off and forming loops, each of said needles comprising a stem, a hook having a base portion formed integrally with one end of the stem, said stem having an edge rising obliquely from the base portion of said hook in the plane thereof and away from the hook to form an inclined edge the highest point of which is located above said hook opening when the needle is in a horizontal position with its hook extending upwardly, the hook opening being defined by the distance of the free end of said hook from said inclined edge, said free end of the hook being spaced from said inclined edge a distance sufficient to permit passage of a thread to and from the hook during loop forming, but spaced sufficiently close to the inclined edge that during loop casting a loop will pass from the stem of the needle over the space between the stem and the free end of the hook without entering the hook.

11. In a knitting machine, a plurality of latchless needles adapted for transferring, casting-off and forming loops, each of said needles comprising a stem, a hook having a base portion formed integrally with one end of the stem, said stem having an edge rising obliquely from the base portion of said hook in the plane thereof and away from the hook to form an inclined edge the highest point of which is located above said hook opening when the needle is in a horizontal position with its hook extending upwardly, the hook opening being defined by the distance of the free end of said hook from said inclined edge, said free end of the hook being spaced from said inclined edge a distance sufficient to permit passage of a thread to and from the hook during loop forming, but spaced sufficient close to the inclined edge that during loop casting a loop will pass from the stem of the needle over the space between the stem and the free end of the hook without entering the hook, the stems of said needles being adapted to support loops or threads to be cast over the hooks and means for moving the needles relative to the threads in such manner that the loops or threads slide over the hook openings and the hooks without being drawn through the hook openings.

12. In a knitting machine, a plurality of latchless needles adapted for transferring, casting-off and forming loops, each of said needles comprising a stem, a hook having a base portion formed integrally with one end of the stem, said stem having an edge rising obliquely from the base portion of said hook in the plane thereof and away from the hook to form an inclined edge the highest point of which is located above said hook opening when the needle is in a horizontal position with its hook extending upwardly, the hook opening being defined by the distance of the free end of said hook from said inclined edge, said free end of the hook being spaced from said inclined edge a distance sufficient to permit passage of a thread to and from the hook during loop forming, but spaced sufficiently close to the inclined edge that during loop casting a loop will pass from the stem of the needle over the space between the stem and the free end of the hook without entering the hook, the stems of said needles being adapted to support loops or threads to be cast off over the hooks, and means for moving the needles relative to the loops or threads in such manner that the loops or threads slide from the highest point of said inclined edges towards and over the hook openings and over said hooks without being drawn through the hook openings.

13. In a knitting machine, a plurality of needles adapted for transferring, casting-off and forming loops, each of said needles comprising a stem, a hook having a base portion formed integrally with one end of the stem, said stem having an edge rising obliquely from the base portion of said hook in the plane thereof and away from the hook to form an inclined edge the highest point of which is located above said hook opening when the needle is in a horizontal position with its hook extending upwardly, the hook opening being defined by the distance of the free end of said hook from said inclined edge, said free end of the hook being spaced from said inclined edge a distance sufficient to permit passage of a thread to and from the hook during loop forming, but spaced sufficiently close to the inclined edge that during loop casting a loop will pass from the stem of the needle over the space between the stem and the free end of the hook without entering the hook, the stems of said needles being adapted to support loops or threads to be cast off over the hooks, means for moving the needles relative to the loops or threads in such manner that the loops or threads slide from the highest point of said inclined edges towards and over the hook openings and over said hooks without being drawn into the hook openings, take-up means associated with said loops or threads, and means for reducing the pull of said take-up means when the loops or threads slide over the hook openings.

14. In a knitting machine, a plurality of latchless needles adapted for transferring, casting-off and forming loops, each of said needles comprising a stem, a hook having a base portion formed integrally with one end of the stem, said stem having an edge rising obliquely from the base portion of said hook in the plane thereof and away from the hook to form an inclined edge the highest point of which is located above said hook opening when the needle is in a horizontal position with its hook extending upwardly, the hook opening being defined by the distance of the free end of said hook from said inclined edge, said free end of the hook being spaced from said inclined edge a distance sufficient to permit passage of a thread to and from the hook during loop forming, but spaced sufficiently close to the inclined edge that during loop casting a loop will pass from the stem of the needle over the space between the stem and the free end of the hook without entering the hook, the stems of said needles being adapted to support loops or threads to be cast off over the hooks, means for moving said loops or threads and means for moving said needles relative to the loops or threads so that the loops or threads move over the hook openings and the hooks without being drawn into the hook openings.

15. In a knitting machine, a plurality of latchless needles, adapted for transferring, casting off and forming loops, each of said needles comprising a stem, a hook having a base portion formed integrally with one end of the stem, said stem having an edge rising obliquely from the base portion of said hook in the plane thereof and away from the hook to form an inclined edge the highest point of which is located above said hook opening when the needle is in a horizontal position with its hook extending upwardly, the hook opening being defined by the distance of the free end of said hook from said inclined edge, said free end of the hook being spaced from said inclined edge a distance sufficient to permit passage of a thread to and from the hook during loop forming, but spaced sufficiently close to the inclined edge that during loop casting a loop will pass from the stem of the needle over the space between the stem and the free end of the hook without entering the hook, the stems of said needles being adapted to support loops or threads, and means for moving said loops or threads and needles relative to one another so that when the loops or threads are to be brought into the hooks of said needles, tension prevails between the loops or threads and the needles when the loops or threads are in front of the hook openings, said tension drawing the loops or threads into the hook openings.

MAX NEBEL.